United States Patent
Mese et al.

(10) Patent No.: US 12,119,985 B2
(45) Date of Patent: Oct. 15, 2024

(54) NOTIFICATION ROUTING SYSTEM AND METHOD FOR MITIGATING DISRUPTIONS

(71) Applicant: LENOVO (SINGAPORE) PTE. LTD., Singapore (SG)

(72) Inventors: John C. Mese, Cary, NC (US); Nathan Peterson, Oxford, NC (US); Arnold Weksler, Raleigh, NC (US); Russell S. VanBlon, Raleigh, NC (US); Mark Delaney, Raleigh, NC (US)

(73) Assignee: LENOVO (SINGAPORE) PTE. LTD, New Tech Park (SG)

(*) Notice: Subject to any disclaimer, the term of this patent is extended or adjusted under 35 U.S.C. 154(b) by 0 days.

(21) Appl. No.: 18/068,336

(22) Filed: Dec. 19, 2022

(65) Prior Publication Data
US 2024/0205076 A1 Jun. 20, 2024

(51) Int. Cl.
*G06Q 10/06* (2023.01)
*H04L 41/0681* (2022.01)
*H04L 43/0811* (2022.01)

(52) U.S. Cl.
CPC ...... *H04L 41/0681* (2013.01); *H04L 43/0811* (2013.01)

(58) Field of Classification Search
None
See application file for complete search history.

(56) References Cited

U.S. PATENT DOCUMENTS

| | | | | |
|---|---|---|---|---|
| 7,444,383 | B2* | 10/2008 | Horvitz | G05B 19/404 709/224 |
| 9,667,366 | B2* | 5/2017 | Herickhoff | H04L 67/535 |
| 2007/0071209 | A1* | 3/2007 | Horvitz | G06Q 10/109 379/201.06 |
| 2012/0309364 | A1* | 12/2012 | Quady | G06Q 30/0241 455/414.1 |
| 2015/0269160 | A1* | 9/2015 | Babaian | G06F 16/48 707/751 |
| 2017/0034649 | A1* | 2/2017 | Dotan-Cohen | H04M 1/72454 |
| 2017/0083839 | A1* | 3/2017 | Carpenter | G06Q 10/06395 |
| 2017/0094638 | A1* | 3/2017 | Borges | H04W 8/005 |
| 2018/0190264 | A1* | 7/2018 | Mixter | G10L 15/22 |
| 2018/0270520 | A1* | 9/2018 | Ott | H04M 19/04 |
| 2019/0073254 | A1* | 3/2019 | Vibhor | G06F 11/0784 |
| 2019/0140892 | A1* | 5/2019 | Jain | H04L 41/16 |
| 2019/0347181 | A1* | 11/2019 | Cranfill | G06F 11/3013 |
| 2021/0329165 | A1* | 10/2021 | Liu | G06F 21/6245 |
| 2022/0122785 | A1* | 4/2022 | Fadell | H02J 3/00 |

\* cited by examiner

*Primary Examiner* — Christopher B Robinson
(74) *Attorney, Agent, or Firm* — Dean D. Small; The Small Patent Law Group, LLC

(57) ABSTRACT

A system and method include monitoring activity of users in a designated environment by receiving device data generated by electronic devices or monitoring network data on a network to which the electronic devices are connected. The system and method determine a pending disruption at the designated environment, and assign at least one of the users as a primary responder to handle the pending disruption based at least in part on the activity of the users. The system and method communication a primary notification to a first electronic device of the electronic devices, with which the primary responder interacts, to notify the primary responder about the pending disruption prior to the pending disruption creating a disturbance at the designated environment.

20 Claims, 3 Drawing Sheets

NOTIFICATION ROUTING SYSTEM AND METHOD FOR MITIGATING DISRUPTIONS

FIELD

The present disclosure generally relates to communicating notifications to user electronic devices.

BACKGROUND OF THE INVENTION

The prevalence of online services has resulted in homes and businesses receiving an increasing amount of deliveries. The deliveries can include mail, groceries, prepared food, goods, and the like. These deliveries can disrupt the activities carried out within the premises. For example, the societal shift to hybrid work schedules and school schedules has caused people to work and study within the home. Disruptions caused by deliveries, people coming to the door, and/or smart home notifications of people in the vicinity of the home can interfere with the ability of people to work and/or study in the home, such as participate in online meetings and/or classes.

Some "smart" devices are configurable by a user to perform different functions in response to different inputs and/or conditions. For example, a doorbell camera which was previously programmed to communicate notifications to a first user's smart phone can be reconfigured to communicate notifications to a second user's smart phone in addition to, or instead of the first user's phone. However, known smart devices operate on static status, such that the smart device performs the same programmed operation (e.g., emit audible ring noise) each time a given input is received (e.g., doorbell button is pressed). This static behavior is not able to effectively route notifications to specific people in the premises that are best able to receive and handle the disruption at the time of the disruption. For example, the person that is the designated receiver of notifications may be outside in a back yard or away from the premises when a delivery occurs, such that the person may not be able to handle the delivery or warn the others about the impending delivery. As a result, the delivery may create a disturbance in the premises that interrupts a work meeting or an online class, wakes a sleeping child, or the like. A need remains for intelligently and contextually managing the routing of a notification of a pending disruption to users in the premises, to reduce the aggregate impact caused by the disruption on activities occurring within the premises.

SUMMARY

In accordance with an embodiment, a method is provided that includes monitoring, via one or more processors, activity of users in a designated environment. The activity of the users is monitored by receiving device data generated by electronic devices or monitoring network data on a network to which the electronic devices are connected. The method includes determining a pending disruption at the designated environment, and assigning at least one of the users as a primary responder to handle the pending disruption based at least in part on the activity of the users. The method includes communicating a primary notification to a first electronic device of the electronic devices, with which the primary responder interacts, to notify the primary responder about the pending disruption prior to the pending disruption creating a disturbance at the designated environment.

Optionally, monitoring the activity of the users includes associating a first activity with a first user of the users based on at least one of (i) a specific electronic device uniquely associated with the first user being used in the first activity, (ii) an authentication uniquely associated with the first user being used to access the first activity, or (iii) a type or identification of the first activity being uniquely associated with the first user. The designated environment may be a residence and/or a business, and determining the pending disruption may include detecting, via one or more sensors, that a third party is within a designated proximity of the residence or the business. Optionally, communicating the primary notification to the first electronic device may automatically cause the first electronic device to emit an audible alert, pause media content, mute a microphone, deactivate a second electronic device, and/or turn off an appliance.

Optionally, the method may include communicating a secondary notification to a second electronic device of the electronic devices, with which a secondary responder of the users interacts. The primary notification is different from the secondary notification. Optionally, the secondary notification may cause the second electronic device to provide a silent notification that does not automatically interrupt the respective activity of the secondary responder. The secondary notification may include a graphical user interface that is displayed on the second electronic device and enables the secondary responder to override an assigned status as the secondary responder and handle the pending disruption.

Optionally, the method may include monitoring respective locations of the users in the designated environment. The primary responder may be assigned based on both the activity of the users and a proximity of the primary responder to the pending disruption. The method may include accessing a user priority list stored in a data storage device. The user priority list may provide a ranked order of the users in the designated environment. The primary responder may be assigned based on both the activity of the users and the ranked order in the user priority list. The method may include monitoring respective locations of the users in the designated environment. The primary responder may be assigned based on the activity of the users, the ranked order in the user priority list, and a proximity of the primary responder to the pending disruption.

Optionally, the method may include recording and analyzing historical user selections input by the users over time via at least one user interface. The primary responder may be assigned based on both the activity of the users and the historical user selections. In response to the activity indicating that at least one of the users is asleep in the designated environment, the method may include suppressing an audible ring of a doorbell.

In accordance with an embodiment, a notification routing system is provided that includes a communication device and a controller including one or more processors. The controller is communicatively connected to the communication device and electronic devices within a designated environment. The controller is configured to monitor activity of users in the designated environment by one or both of receiving device data generated by the electronic devices or monitoring network data on a network to which the electronic devices are connected. The controller is configured to determine a pending disruption at the designated environment, and assign at least one of the users as a primary responder to handle the pending disruption based at least in part on the activity of the users. The controller is configured to communicate, via the communication device, a primary notification to a first electronic device of the electronic devices, with which the primary responder interacts, to notify the primary responder about the pending disruption prior to the pending disruption creating a disturbance at the designated environment.

Optionally, the notification routing system includes one or more sensors communicatively connected to the controller. The controller may determine the pending disruption in response to the one or more sensors detecting a presence of a third party within a designated proximity of the designated environment. Optionally, the notification routing system includes the first electronic device, and, in response to receiving the primary notification, the first electronic device may emit an audible alert, pause media content, mute a microphone, deactivate a second electronic device, and/or turn off an appliance. Optionally, the controller may communicate, via the communication device, a secondary notification to a second electronic device of the electronic devices, with which a secondary responder of the users interacts. The primary notification is different from the secondary notification. The notification routing system may include the second electronic device, and, in response to receiving the secondary notification, the second electronic device may provide a silent notification that does not automatically interrupt the respective activity of the secondary responder.

Optionally, the notification routing system may include a data storage device communicatively connected to the one or more processors. The controller may access a user priority list stored in the data storage device. The user priority list may provide a ranked order of the users in the designated environment. The controller may assign the primary responder based on both the activity of the users and the ranked order in the user priority list. The controller may monitor respective locations of the users in the designated environment. The controller may assign the primary responder based on the activity of the users, the ranked order in the user priority list, and respective proximities of the users to the pending disruption.

In accordance with an embodiment, a computer program product is provided that includes a non-transitory computer readable storage medium. The non-transitory computer readable storage medium includes computer executable code configured to be executed by one or more processors to monitor activity of users in a designated environment by one or both of receiving device data generated by electronic devices in the designated environment or monitoring network data on a network to which the electronic devices are connected. The computer executable code is configured to be executed by one or more processors to determine a pending disruption at the designated environment, and assign at least one of the users as a primary responder to handle the pending disruption based at least in part on the activity of the users. The computer executable code is configured to be executed by one or more processors to communicate a primary notification to a first electronic device of the electronic devices, with which the primary responder interacts, to notify the primary responder about the pending disruption prior to the pending disruption creating a disturbance at the designated environment.

DETAILED DESCRIPTION

Figure 1:
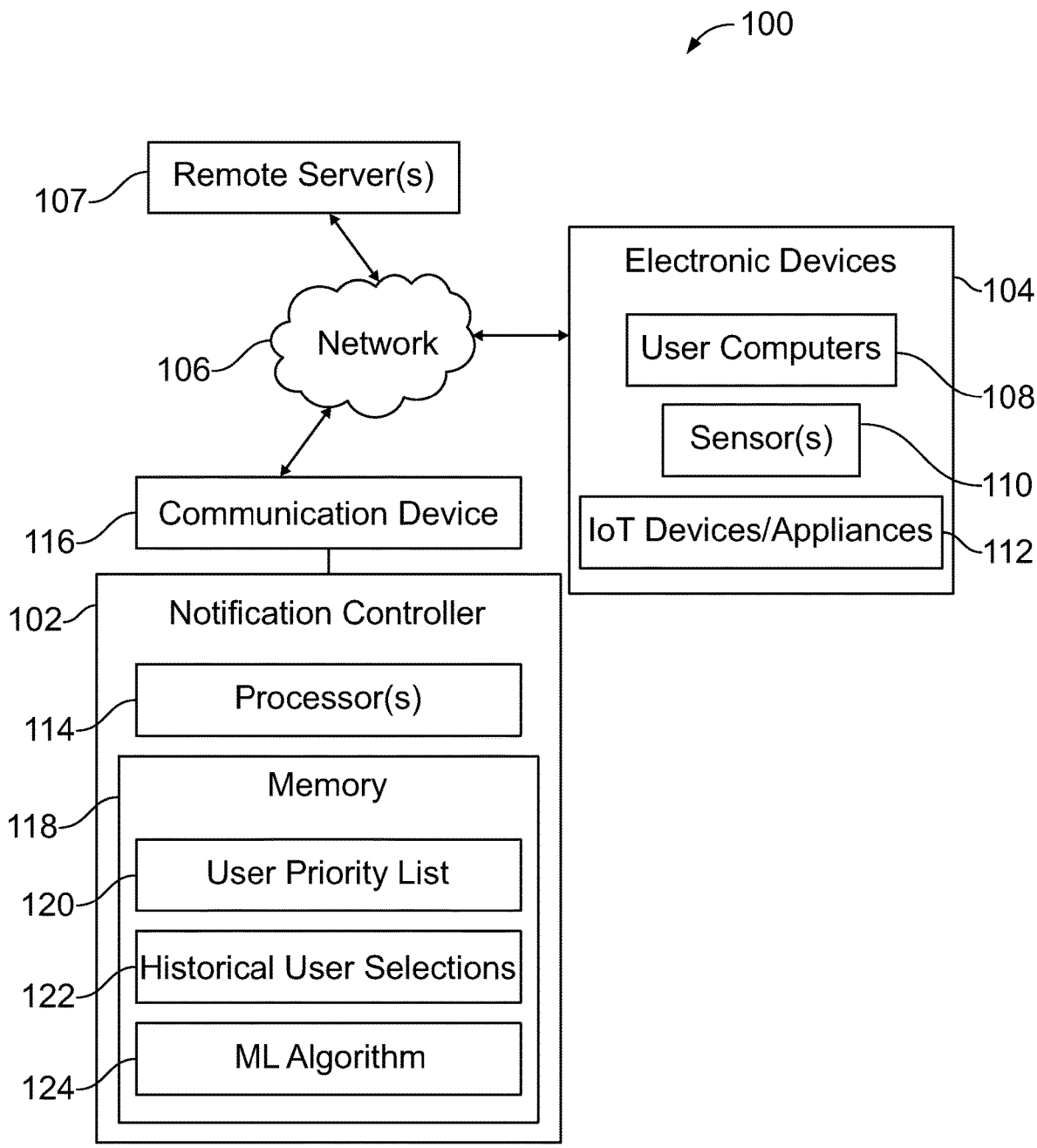
FIG. 1 is a schematic block diagram of a notification routing system according to an example of the present disclosure.

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

Examples of the present disclosure provide a notification routing system and method that proactively determine a pending disruption and intelligently, based on contextual information, direct a notification to appropriate person(s) to limit the overall impact of the disruption on the people in the premises. The system and method include monitoring the activity of users in a designated environment. The designated environment may be a residence or business. The users referred to herein are people that are affiliated with the designated environment, such as people that live in the residence or work at the business. The activity of the users refers to tasks performed by the people in the designated environment. Example activities can include working on a computer, watching television, studying, participating in an online meeting or class, sleeping, reading, eating, preparing a meal, cooking, showering, performing lawn care, cleaning, working out, and/or the like.

The system and method presented herein may monitor the activity of the users in the environment by analyzing device data generated by electronic devices and/or analyzing network data on a network to which the electronic devices are connected, as described herein. For example, the system and method may collect information from various electronic devices in the designated environment that are connected to a common network. The electronic devices may include personal computing devices, such as smart phones, that may be associated with a specific user. The electronic devices can also include sensor devices, such as doorbell cameras, and network-connected "smart" devices and appliances, such as televisions. Aggregating information from various devices enables the system and method to collaboratively monitor the activity of the users in the environment, and even associate individual activities with specific users.

The system and method of the embodiments described herein can determine a pending disruption at the designated environment. The pending disruption may involve a third party person (e.g., not affiliated with the designated environment) approaching the designated environment, such as walking up to a front door of the building. For example, the disruption may be a delivery person dropping off a delivery. The pending disruption may be determined based on sensor data, such as a proximity sensor, motion sensor, or image analysis sensor detecting the presence of the third party person within a vicinity of the designated environment. Optionally, the pending disruption may be determined based on a received message communicated from a remote source. For example, some services provide notifications to the intended recipient when the delivery entity is nearby the recipient's premises to prepare the recipient for the impending arrival of the delivered goods/items. In an example, the system and method of the embodiments may determine the pending disruption in response to receiving a message indicating that the delivery entity is only a few stops away from the designated environment.

The system and method may assign at least one of the users in the designated environment as a primary responder to handle the pending disruption based on one or more factors. The one or more factors include the activity of the users. For example, depending on the contextual information about the activities engaged by the users in the designated environment at the time of the pending disruption, the system and method may intelligently select one or more of the users as the most appropriate person(s) to handle the pending disruption. This determination depends on the competency and/or ability of the person to receive the delivery without undue negative impact on the person's present activity. For example, the system and method may select a first adult that is playing a video game as the primary responder over a second adult that is participating in an online work meeting, because the first adult pausing the game to answer the door may represent less of an inconvenience overall than the second adult stepping out of the work meeting to answer the door. The system and method may consider additional factors besides the activity of the users. Additional factors may include locations of the users, ranked priorities among the users, and historical selections made by the users.

The system and method may communicate a primary notification to the primary responder to notify the primary responder about the pending disruption prior to the pending disruption creating a disturbance at the designated environment. For example, the primary responder may receive the primary notification through a first electronic device, with which the primary responder interacts. In an example, the system and method may communicate the primary notification to the primary responder's personal smart phone. In another example, if the primary responder's attention is directed to a display of another electronic device, such as a television or a laptop computer, the primary notification may be communicated to that other electronic device to present the notification in the form of a text-based message on the display and/or an image or video feed showing the third party approaching the premises. Upon receiving the primary notification, the primary responder can suspend their current activity and move to the location of the pending disruption to handle the disruption, such as by opening the front door, collecting the mail or goods that are delivered, speaking to the third party person, or the like. Optionally, the primary responder may take other actions to handle the disruption, such as containing dogs or other pets in a pen or room, letting pets outside into a back yard, or the like. Addressing dogs, for example, may limit the disturbance caused by the pending disruption by reducing the likelihood that the dogs will bark and/or limiting the interference that dog barks inflict on the activities of the other users in the designated environment. For example, by intelligently selecting the primary responder and tipping off the primary responder about the presence of the pending disruption, the primary responder can handle the disruption without significant, if any, negative impact on other users in the designated environment, such as sleeping children.

The system and method of the embodiments described herein are designed to reduce the collective or aggregate disturbance (e.g., inconvenience) caused by the disruption, relative to known smart home systems. For example, the system and method may select different users to handle different pending disruptions depending on the activities of the users and/or other factors, rather than always directing disruption notifications to the same user or users according to a default or user-selected setting. As described above, in some instances, it may be more appropriate for a second user to handle a pending disruption than a first user, based on the activities of the first and second users. The system and method collaboratively monitor the activities of the users to determine notification routing among the users, in order to limit the disturbance created by pending disruptions by third parties at the designated environment. Limiting or avoiding disturbances can improve the enjoyment, efficiency, and output of the users in performing the activities within the designated environment.

References herein to "machine learning" and "artificial intelligence" refer to algorithms that learn, via training, from various automatic or manual feedback, such as observations and/or data. The artificial intelligence algorithms may be adjusted (e.g., trained) over multiple iterations based on the observations and/or data. For example, the artificial intelligence algorithms may be adjusted by supervised learning, unsupervised learning, and/or reinforcement learning (e.g., customer feedback). Non-limiting examples of artificial intelligence algorithms include decision trees, K-means, deep learning, artificial neural networks (e.g., convolutional neural networks), and/or the like.

References herein to "electronic device", unless specified, shall mean any of various types of hardware devices that can connect to a network. The electronic devices may be connected to a common network within the designated environment, which enables the electronic devices to communicate with one another. Example electronic devices can include personal computing devices (computers), smart devices, and even smart appliances according to the Internet of Things. The personal computing devices may include smart phones, tablet computers, laptop computers, desktop computers, smart watches, and other wearable computing devices. The smart devices may include digital assistants, televisions, audio equipment (e.g., speakers), security cameras, doorbell systems, digital thermostats, and the like. The smart appliances can include refrigerators, ovens, HVAC systems, and/or the like, that include the electronic equipment necessary to connect to the network.

References herein to "designated environment" refer to premises that include at least a portion of a building (e.g., real estate). The designated environment may be a residence (e.g., single family home, apartment, condominium, multifamily home, or the like). Optionally, the designated environment may be a business, such as a dentist office or other small business. The designated environment may include a parcel of land surrounding the building and incorporated into the designated environment as a yard, driveway, parking lot, or the like.

FIG. 1 is a schematic block diagram of a notification routing system 100 according to an example of the present disclosure. The notification routing system 100 includes a notification controller 102 that is communicatively connected to various electronic devices 104. For example, the notification controller 102 may be connected to the electronic devices 104 via a network 106 to which the electronic devices 104 are connected. The electronic devices 104 are associated with a designated environment. For example, the electronic devices 104 may be located within the designated environment, unless and until a user removes one of the electronic devices 104 from the designated environment. The network 106 may be the Internet, a local area network, or the like. The system 100 may include additional components not shown in FIG. 1, such as at least one wireless router. The notification controller 102 performs at least some of the operations of the notification routing system 100 described herein, including determining which users to notify regarding impending disruptions to limit the disturbance created by the disruption on the users in the designated environment.

The electronic devices 104 may include user computer devices 108, one or more sensor devices 110, and Internet of Things (IOT) devices and/or appliances 112. The user computer devices 108 may include smart phones, tablet computers, laptop computers, desktop computers, smart watches, other wearable computer devices, and the like. At least some of the user computer devices 108 may be personal devices associated with a specific user in the designated environment. For example, at least some of the family members that live in the house may have their own personal phone, tablet, laptop, smart watch, and/or the like. The sensor devices 110 have sensors that detect and/or measure various parameters. The sensor devices 110 may include security cameras, motion sensors, proximity sensors, audio sensors, and/or the like. At least some of the sensor devices 110 may be mounted to the building to monitor activity outside of the building. For example, a security camera may be installed on a house and/or business generate image data within a field of view that captures a door of the building and the area outside leading to the door. The security camera or other sensor devices may monitor for the presence of third party people (such as delivery drivers) approaching the door. The IoT devices and/or appliances 112 include various hardware that has integrated network circuitry to enable the devices and/or appliances to connect to the network 106 and communicate with other devices/appliances on the network 106. This category can include digital assistant devices, televisions, audio receivers and other audio equipment, smart doorbell cameras, smart thermostats, smart refrigerators, smart lighting systems, and various other smart devices and appliances within the home and business.

The notification routing system 100 optionally may include one or more remote servers 107. The notification controller 102 may be connected to the remote servers 107 via the network 106. The remote servers 107 may be remote from the designated environment. For example, the remote servers 107 may be located at a data center that hosts servers for cloud computing and/or cloud data storage. The remote servers 107 may provide various cloud-based services to the notification controller 102 via the network 106. The services may include data storage and/or processing.

The notification controller 102 may be a component of one of the electronic devices 104, one of the remote server(s) 107, the router, or another network device. For example, the notification controller 102 may be centralized to a software agent that is installed or downloaded on one of the devices. In another example, the notification controller 102 may be distributed among multiple electronic devices 104, remote servers 107, routers, and/or the like. For example, the notification controller 102 may be decentralized among multiple devices that each run a software agent in a peer-to-peer communication arrangement.

The notification controller 102 represents hardware circuitry that includes and/or is connected with one or more processors 114 (e.g., one or more microprocessors, integrated circuits, microcontrollers, field programmable gate arrays, etc.). The notification controller 102 includes and/or is connected with a tangible and non-transitory computer-readable data storage medium (e.g., data storage device), referred to in FIG. 1 as memory 118. The data storage device 118 may store programmed instructions (e.g., software) that are executed by the one or more processors 114 to perform the notification routing operations described herein. The programmed instructions may include one or more algorithms utilized by the one or more processors 114. Some of the information stored in the data storage device 118 may be within a database. The data storage device 118 may store additional applications, such as various application program interfaces (APIs) that link to cloud hosting services, via a communication device 116 connected to the controller 102, for accessing information from the remote server(s) 107.

In the illustrated embodiment, the data storage device 118 stores a user priority list 120, historical user selections 122, and a machine learning algorithm 124. The user priority list 120 may rank the users affiliated with the designated environment in an order. The ranking may be associated with handling disruptions in the form of third party people approaching the building. As used herein, third party people refers to people that are not affiliated with the designated environment, such as people that do not live in the residence, do not work at the business, and do not shop at the business. Third party people includes delivery drivers, mail workers, salespeople, census workers, poll takers, neighbors, and/or the like. In an example, the user priority list 120 may designate a mom of a family that lives in the residence as the highest ranking, followed by the dad, and then the children in order from oldest to youngest. The user priority list 120 may be set by the family and modified as desired via user configurable settings. The notification controller 102 may consider the rankings in the user priority list 120 as a factor when assigning at least one of the users as the primary responder to handle a determined pending disruption.

The historical user selections 122 may be a record of user selections received by the notification routing system 100 over time. For example, the notification controller 102 may record and track user inputs. The user selections may include manual overrides of the user that is assigned to be the primary responder to handle a pending disruptions. For example, if the notification controller 102 assigns the dad to be the primary responder for handling a determined pending disruption, and a child manually overrides the controller 102 to volunteer as the primary responder, then controller 102 may record this manual override. The historical user selections may include details, such as the identity of the first user assigned to be the primary responder and the second user that volunteered to handle the pending disruption.

The machine learning algorithm 124 may be an artificial neural network. The machine learning algorithm 124 may be used to assign at least one of the users as the primary responder based on the current factors, including activity of the users, and historical behavior of the users. For example, the machine learning algorithm may be trained to analyze the historical user selections 122 and determine which user(s) to assign as the primary responder for handling a pending disruption based at least on prior recorded behavior of the users. By factoring historical behavior using the machine learning algorithm 124, the notification controller 102 may adapt over time to more closely conform to the specific users in the designated environment. For example, if a first user routinely overrides the notification controller 102 to handle pending disruptions that occur within a given daily time period, then the machine learning algorithm 124 may adjust weights to more heavily favor assigning the first user as the primary responder in the future for pending disruptions that occur during that daily time period.

The notification controller 102 is communicatively connected to a communication device 116 via a wired conductive pathway. The communication device 116 may represent hardware circuitry that can communicate electrical signals via wireless communication pathways and/or wired conductive pathways. The communication device 116 may include transceiving circuitry, one or more antennas, and the like, for wireless communication. The communication device 116 may connect to the network 106 via the router. Alternatively, the communication device 116 may connect to the network 106 via a wired connection to a modem or the like.

The notification controller 102 may use the communication device 116 to communicatively connect to the electronic devices 104. For example, the communication device 116 may receive device data generated by the electronic devices 104. The device data can include sensor data generated by the sensor devices 110, operational status data generated by the IoT devices and/or appliances 112, and both sensor data and operational status data generated by the user computers 108. The sensor data can include image data generated by a camera, motion detection data, proximity data, and/or the like. The operational status data refers to information about the current operation of the respective device or appliance. The information about the current operation can include whether the device or appliance is active or inactive (e.g., On or Off), which software applications are currently active in a computer device, which user is currently logged-in to the device or software application, and/or the like.

The notification controller 102 may use the device data received by the communication device 116 from the electronic devices 104 as context to determine and monitor the activity of the users in the designated environment. The notification controller considers the activity of the users as a factor when determining which user(s) to assign as the primary responder to handle a pending disruption, to limit the disturbance caused by the pending disruption. In an example, the notification controller 102 may monitor activity of users in the designated environment by receiving device data generated by the electronic devices 104. For example, based on the received device data, the notification controller 102 may determine which devices and/or appliances are currently active and operating. Active devices and/or appliances may serve as evidence that one or more users are interacting with the active devices and/or appliances. For example, an active television may indicate that at least one of the users is watching television. An active video conference application on a laptop may indicate that one of the users is participating in a video call. An active oven can indicate that a user is cooking.

For example, a digital assistant device may be able to detect that a room is occupied based on analyzing a parameter indicative of a user's presence or detecting proximity to a phone or wearable device carried by the user. The parameter indicative of the user's presence may include detecting the user's voice in the room, detecting motion in the room, detecting body heat, and/or the like. A digital assistant device may include an audio sensor, a proximity sensor, and/or the like that is used to detect sound and/or motion in the room. Another example is a home security camera that generates image data in a field of view that captures a specific room or area of the environment, and detecting a person in that image data.

Multiple sources of device data indicating that a user is performing an activity can be used by the notification controller 102 to confirm a user activity. Based on the detection of a user in a specific room and an operating television in the same room, for example, the notification controller 102 can surmise that the user in the room is watching television. The notification controller 102 may also rely on the lack of user activity within the room to determine the activity of the user by process of elimination to rule out other possible activities of the user in that room.

The notification controller 102 may monitor the activity by communicating with the electronic devices 104 connected to the network 106, as described above. Optionally, instead of, or in addition to, communicating with the electronic devices 104 to receive device data, the notification controller 102 may monitor network data (e.g., traffic) on the network 106 to which the electronic devices 104 are connected to determine the activity of the users. For example, the notification controller 102 may be able to monitor network utilization to determine which devices and/or appliances are receiving network data at a given time and/or to determine the type of network data that is being communicated to and from those devices and/or appliances. For example, the notification controller 102 may determine that a laptop computer or tablet computer is receiving and outputting live video feeds, which indicates that a user is participating in a video call.

In an embodiment, the notification controller 102 may monitor the activity of the users on demand in response to determining that there is a pending disruption, as described below. For example, upon determining the pending disruption, the controller 102 may ping (e.g., communicate an update request message) to the electronic devices 104 on the network 106, requesting operating status updates from the electronic devices 104, and/or may temporarily monitor the network traffic. Alternatively, the notification controller 102 may continuously monitor the operational status of the electronic devices 104. The notification controller 102 may not save or transmit information of monitored user activity to preserve user privacy.

Monitoring the activity of the users by the notification controller 102 may include associating specific users with different detected activities. For example, the notification controller 102 may associate a first activity with a first user of the users based on (i) a specific electronic device uniquely associated with the first user being used in the first activity, (ii) an authentication uniquely associated with the first user being used to access the first activity, and/or (iii) a type or identification of the first activity being uniquely associated with the first user. The specific electronic device uniquely associated with the first user may include computer devices that are owned, possessed, or otherwise typically only operated by the first user. Examples include the first user's smart phone, smart watch, tablet computer, laptop computer, or the like. If the first user is typically the only person that uses a specific laptop computer, then the notification controller 102 may determine that the first user is interacting with the laptop computer whenever active operation of the laptop computer is detected, unless additional information refutes this assumption. In this case, the notification controller 102 may determine that the activity of the first user is interacting with the laptop computer. The notification controller 102 may determine more details about the first user's activity based on the way that the laptop computer is operating, such as what software applications are open (e.g., active) and what kind of data is being fed to or from the laptop computer.

In addition, information from the first user's specific phone or other uniquely-associated device can be used by the controller 102 to locate that first user, which provides clues about the first user's activity. In the example about the television above, if the controller 102 determines that the television is On and displaying a video game system in a living room, detecting that the first user's phone or watch is within the living room provides evidence to conclude that the first user is in the living room playing or watching the video game.

In the second example above, the notification controller 102 may associate a first activity with the first user based on an authentication uniquely associated with the first user being used to access the first activity. For example, the first user may be forced to log in to a profile on a computer, television, or the like, before interacting with the device. The log in credentials may be specific to the first user alone. In that case, in response to determining that the someone has successfully authenticated to achieve access to the profile, the notification controller 102 can determine that the first user is the person interacting with that computer, television, or the like. Optionally, the log in credentials may be specific to a subset of multiple users, but not all of the users. For example, the parents, but not the children, may have the credentials to access a certain profile. Indicating of a successful authentication to access the profile can be used by the controller 102 in additional to other data, such as detected locations of the parents' phones relative to the device that received the log in attempt, to decipher which user (e.g., which parent) is the one that logged in.

In the third example above, the notification controller 102 may associate a first activity with the first user based on a type or identification of the first activity being uniquely associated with the first user. Some types of activities are typically only performed by one or a subset of the users, as determined by the notification controller 102 through historical observation or a priori reasoning. As an example, if a white noise sound machine and/or nightlight, which is located in a first child's bedroom, is determined to be On, the controller 102 may deduce that the first child is sleeping, which represents the activity of the first child. The sound machine may be only associated with the first child due to the location of the sound machine in the first child's bedroom. In another example, if typically only a second child plays a certain video game, then the controller 102 may determine that the activity of the second child is playing video games whenever the controller 102 detects that the specific video game is being played.

In an embodiment, the notification controller 102 determines a pending disruption at the designated environment. Determining the pending disruption may include detecting, via the one or more sensors 110, that a third party is within a designated proximity of the residence or the business that represents the designated environment. The notification controller 102 may determine the pending disruption in response to detecting the presence of the third party within the designated proximity. For example, a security camera and/or doorbell camera may detect the presence of a person approaching the designated environment.

Figure 2:
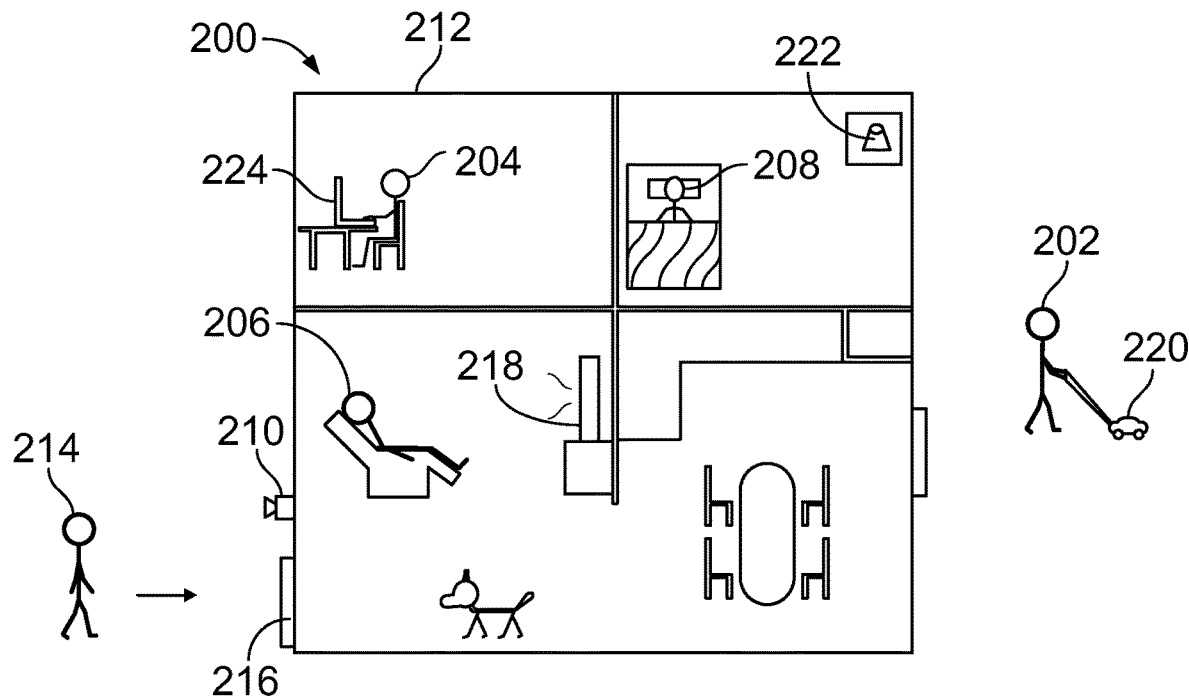
FIG. 2 illustrates a residence that implements the notification routing system shown in FIG. 1 according to an embodiment.

FIG. 2 illustrates a residence 200 that implements the notification routing system 100 shown in FIG. 1 according to an embodiment. The residence 200 represents a designated environment. The residence 200 may be a single family home in FIG. 2. Multiple users are affiliated with the residence 200. The users may be family members. The users in FIG. 2 include a first user 202, a second user 204, a third user 206, and a fourth user 208. In FIG. 2, a sensor 210 mounted along an exterior wall of the residence building 212 can detect the presence of a third party person 214 approaching a front door 216 of the residence 200. The sensor 210 may be a motion sensor, proximity sensor, camera, or the like. The sensor 210 may detect the third party person 214 when the third party person is within a designated proximity of the building 212 and front door 216. The designated proximity may be 5 meters (m), 10 m, 20 m, or the like. The notification controller 102 in FIG. 1 may receive the sensor data from the sensor 210 that indicates the presence of the third party person 214 within the designated proximity. In response, the notification controller 102 may determine the pending disruption.

In another example, the notification controller 102 may determine the pending disruption based on a notification message received from a remote source, such as a remote server 107. For example, the remote server 107 may communicate with a delivery driver vehicle or computer device onboard the vehicle. The delivery driver may have an item to deliver to the residence 200. In response to determining that the delivery driver is within a designated proximity distance (e.g., 1 mile) or is a designated threshold number of stops away (e.g., 3 stops), the remote server 107 may communicate the notification message to the notification controller 102. The notification controller 102 may receive the notification message via the communication device 116, such as through the network 106. The delivery driver may be outside of the designated proximity that is monitored by the sensor 210 when the notification message is received by the notification controller 102. In response to receiving the notification message, the controller 102 may determine the pending disruption. Depending on the estimated amount of time before the delivery, the controller 102 may delay sending notifications to the users for at least a period of time. Delaying the notifications to the users may ensure that the users don't receive the notifications too far in advance, which could cause a greater disturbance as the users suspend their activities to wait for the delivery.

The notification controller 102 may then assign at least one of the users as a primary responder to handle the pending disruption based at least in part on the activity of the users. The primary responder refers to a temporary title given to the user or users that the notification controller 102 determines is most appropriate for addressing the pending disturbance to limit the overall disturbance to the designated environment. The primary responder may address the pending disruption by moving to the location of the pending disruption, talking with the third party person, inviting the third party person into the building, paying the third party person, collecting an item delivered by the third party person, and/or the like. The primary responder is expected to suspend their activity during the pending disruption until after the pending disruption is over.

The notification controller 102 may assign at least one of the users as the primary responder to handle the pending disruption based on one or more factors, including the activity of the users that as monitored. The notification controller 102 may select which user or users to be the primary responder by weighing the potential repercussions of each user suspending their respective activity to handle the pending disruption. For example, with reference to FIG. 2, the third user 206 pausing a movie or video game would have less severe (e.g., less negative) repercussions than the second user 204 having to step out of an online class or online work meeting and the fourth user 208 having to wake up to handle the disruption. In an embodiment, the notification routing system 100 may store a set of configurable priorities that rank various possible activities of the users in terms of the inconvenience level of suspending the activity to handle the pending disruption. In an example, work tasks and school tasks may be assigned with a greater inconvenience level or value in the set of configurable priorities than activities associated with entertainment, such as watching streaming content, playing video games, listening to music, and/or the like. The set of configurable priorities may be stored in the data storage device 118. The set of configurable priorities may be modifiable by the users.

In an embodiment, the notification controller 102 may monitor respective locations of the users in the designated environment, and may assign the primary responder based on the activity of the users as well as the locations of the users. In a simple example, if the controller 102 determines that a specific user is performing a given activity, due to a unique log-in, a unique type of activity, or the interaction with a specific, uniquely-associated device, and the device is in a known location, then the controller 102 determines that the user is in that known location. For example, the controller 102 may determine that the fourth user 208 is in the fourth user's room due to the operation of the sound machine 222. The controller 102 may determine that the second user 204 is in the office due to the second user 204 providing unique credentials to sign on to a desktop computer 224 that remains in the office.

In another example, if the controller 102 is not able to determine the user's location based solely on the activity, the controller 102 may use device data to determine the location of a personal computer device that is carried or worn by the user. These personal computer devices can include smart phones, smart watches, and/or the like. The location may be an absolute location, such as global positioning system (GPS) coordinates determined by a smart phone and/or smart watch. Alternatively, the location may be a relative location of the personal computer device relative to a reference device or location. For example, the controller 102 may monitor signal strength of communications between a personal computer device on the network 106 and the router to determine the proximity of the personal computer device (e.g., and therefore the associated user) from the router. In another example, the controller 102 can determine the proximity of the personal computer device from a digital assistant device based on time of flight characteristics of signals communicated between the digital assistant device and the personal computer device. In yet another example, the controller 102 may determine locations of the users based on sensor data. For example, the controller 102 may detect that one of the users is in the dining room based on a digital assistant device in the dining room recognizing that user's voice in the room. In another example, a user that is outside in the back yard may be detected in image data generated by a security camera.

The notification controller 102 may use the determined respective locations of the users to determine respective proximities of the users to the pending disruption. The controller 102 may map the positions of the users within the designated environment. The notification controller 102 may weight the users based on the proximities, such that a first user that is closer to the pending disruption may be more likely to be assigned the primary responder than a second user that is farther from the pending disruption.

In FIG. 2, the first user 202 is outside of the residence 200 in a back yard. The first user 202 may be performing yard work, such as mowing the lawn. Optionally, the lawn mower 220 may represent one of the electronic devices 104 that is connected to the network 106, such that the controller 102 is able to confirm that the first user 202 is mowing the lawn based on the lawn mower being active and the first user's personal computer devices placing the first user outside of the residence 200. When assigning the primary responder, the notification controller 102 my weight the first user 202 lower than the other users 204, 206, 208 based on the greater distance of the first user 202 from the front door 216.

In an embodiment, the notification controller 102 considers both the activity and the location of the users. Even though the first user 202 is farther from the front door 216 than the fourth user 208, for example, the notification controller 102 may select the first user 202 to be the primary responder over the fourth user 208 while the fourth user 208 is asleep. In the illustrated embodiment, the third user 206 would be selected as the primary responder over the first, second, and fourth users 202, 204, 208 because the third user 206 is close to the front door 216 and is consuming entertainment from a television 218, which is associated with a low inconvenience value. The third user 206 is most proximate to the pending disruption. It would be more inconvenient to make the first user 202 come inside, to make the second user 204 step out of the online meeting or class, and/or to wake the fourth user 208, than to have the third user 206 pause the media content (e.g., game, video, show, etc.) to handle the pending disruption at the front door 216.

In an embodiment, another factor considered by the notification controller 102, in addition to at least the activity of the users, may be a ranked order of the users affiliated with the designated environment. The ranked order of the users may be provided in the user priority list 120 shown in FIG. 1. The user priority list may provide a default preference order for assigning the users as the primary responder, if all else is the same between the users. For example, if all of the users are engaged in the same activity (and at the same location relative to the pending disruption), the controller 102 may assign the user that is available with the highest ranking as the primary responder. If the user with the highest ranking is determined to be out of the environment (e.g., away from the residence 200), then that user is not available and the controller 102 may consider the next highest ranked user in the list for possibly assigning as the primary responder. The user priority list may be set by the users in advance and stored in the data storage device 118.

In an example with reference to FIG. 2, the first user 202 may have the greatest or highest rank in the user priority list 120, followed by the second user 204, then the third user 206, and lastly the fourth user 208. Optionally, the users may configure the user priority list 120 to designate certain users as universally unavailable to perform the role of primary responder to a pending disruption. For example, minor children may be designated as universally unavailable. In FIG. 2, the fourth user 208 may be a minor, and the user priority list 120 may either omit mention of the fourth user 208 or designate the fourth user 208 as unavailable to be assigned primary responder. The notification controller 102 may select which user or users to be the primary responder based on the users in the user priority list 120 that are available (e.g., present at the designated environment and not deemed unavailable), the ranked order of the users in the user priority list, and the activity of the available users. Optionally, the controller 102 may also factor the locations of the available users relative to the pending disruption, as described above.

In an embodiment, another factor considered by the notification controller 102 to assign the primary responder, in addition to at least the activity of the users, may be the historical user selections 122 input by users over time via at least one user interface. The historical user selections 122 may include a record of user inputs that can be analyzed by the notification controller 102 (e.g., the machine learning algorithm 124) to determine user preferences and/or trends which inform the assignment process. The historical user selections 122 may include contextual meta-data that is saved and analyzed to improve match confidence for future notification routing. As described above with reference to the historical user selections 122 in FIG. 1, manual overrides of the users are recorded by the system 100. If a particular user selection as the primary responder is routinely overridden by one of the users, the notification controller 102 may adapt by assigning the user that typically assumes the primary responder role as the primary responder for a future pending disruption that has similar circumstances as the disruptions associated with the manual overrides. For example, the controller 102 may modify weights assigned to various factors (e.g., activity, location, user priority rank, etc.) based on the user inputs (e.g., manual overrides).

The notification controller 102 may select which user or users to be the primary responder based on the historical user selections 122 and the activity of the available users. Optionally, the controller 102 may also factor the locations of the available users relative to the pending disruption and/or the user priority list 120. In an embodiment, the notification controller 102 considers each of the activity of the users, the locations of the users, the user priority list 120, and the historical user selections 122 when assigning the primary responder. The factors for each user may be scored and aggregated, and the aggregate score values for the different users may be compared by the controller 102 to determine which user(s) are assigned to be the primary responder. For example, the controller 102 may omit any users that are unavailable due to not being present at the designated environment and/or marked as universally unavailable in the user priority list 120. Of the available remaining users, the controller 102 may generate a first respective inconvenience value (or convenience value) for each user based on the inconvenience of suspending the current activity of the user. The controller 102 may provide a second respective inconvenience value for each user based on the inconvenience of moving from the current location of the user to the site of the pending disruption.

The controller 102 may factor these first and second inconvenience values with the ranked order of the available users and any historical user selections 122. For example, the first user 202 in FIG. 2 may have a higher ranking than the third user 206, but the inconvenience values of the first user 202 and the third user 206 may be so offset (e.g., the inconvenience to the first user 202 is substantially greater than the inconvenience to the third user 206) that the controller 102 determines, upon weighing all of the factors, to assign the third user 206 as the primary responder instead of the first user 202. Assigning the third user 206 as the primary responder avoids the significant inconvenience to the first user 202, and thereby limits the overall disturbance to the environment caused by the pending disruption.

After assigning at least one of the users as the primary responder, the notification controller 102 may communicate, via the communication device 116, a primary notification to a first electronic device of the electronic devices, with which the primary responder interacts. The first electronic device may be a personal computer device carried or worn by the primary responder. Optionally, the first electronic device may be a television if the primary responder is watching the television or playing a video game on the television. The first electronic device may be a laptop or desktop computer that the primary responder is operating/using. The primary responder is referred to herein in the singular, but the notification controller 102 optionally may assign multiple users to be the primary responder. The primary notification is designed to alert the primary responder about the pending disruption and provide details for handling the pending disruption. The primary notification also informs the user that the user has been assigned as the primary responder.

In response to receiving the primary notification, the first electronic device may alert the primary responder by automatically providing an audible, visual, or tactile indication. If applicable, the first electronic device may emit an audible alert, automatically pause media content, mute a microphone used by the primary responder, deactivate a second electronic device interacted with by the primary responder, or turn off an appliance interacted with by the primary responder. In an example, the first electronic device is a computer device used, carried, or worn by the primary responder, and the primary notification is displayed as a text-based message on a display screen of that computer device. The computer device may also chime and/or vibrate in addition to displaying the message to ensure that the primary responder notices the primary notification.

The first electronic device and/or the notification controller 102 may automatically deactivate a second electronic device, mute the microphone, turn off the appliance, pause the media content, and/or the like to further grab the primary responder's attention and reduce the likelihood of the primary responder ignoring the primary notification to continue the current activity without handling the pending disruption. If the primary responder is cooking for example, the first electronic device and/or notification controller 102 may turn off a range or oven for safety considerations as the primary responder leaves the kitchen to address the pending disruption. In an example in which the controller 102 determines, by monitoring the activity of the users, that at least one of the users is asleep during the pending disruption, the first electronic device and/or notification controller 102 may automatically suppress an audible ring of a doorbell. If the third party person presses the doorbell, the doorbell does not ring in the house to avoid waking up the sleeping user(s).

The primary notification may be communicated prior to the pending disruption occurring, which provides the primary responder time to prepare. For example, the primary responder may have time to get to the door before the third party person reaches the door, and may have time to prepare pets and/or straighten up the area of the environment near the door. Dogs may bark at hearing the presence of visitors outside, so the primary responder may have time to put the dogs outside, in the basement, or in a different room to avoid or at least limit the disturbance created by the dog barks.

In an embodiment, the notification controller 102 may communicate, via the communication device 116, a secondary notification to a second electronic device of the electronic devices, with which a secondary responder of the users interacts. The secondary responder may be any available users that are not assigned as the primary responder. The secondary notification may be different from the primary notification. For example, the secondary notification may provide different information and/or may be provided in a different way than the primary notification. Optionally, the controller 102 may communicate the secondary notification to all of the other users in the designated environment. The secondary notification may be communicated to the personal computer devices of the secondary responders or other electronic devices interacted with by the secondary responders. For example, a second electronic device that receives the secondary notification may provide a silent notification that does not automatically interrupt the respective activity of the secondary responder. In contrast, the primary notification may vibrate and/or emit a sound and automatically interrupt the respective activity of the primary responder. The secondary notification may include a graphical user interface that is displayed on the second electronic device and enables the secondary responder to override an assigned status as the secondary responder and handle the pending disruption.

Figure 3:
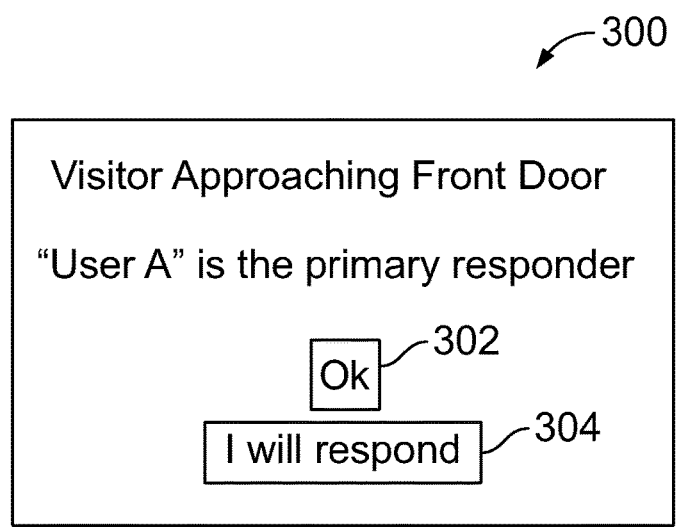
FIG. 3 illustrates a graphical user interface of a secondary notification according to an embodiment.

FIG. 3 illustrates a graphical user interface (GUI) 300 of a secondary notification according to an embodiment. The GUI 300 is a text-based message that provides information to the secondary responder about the pending disruption. The information may include general information such as the location of the disruption and the user that is assigned as the primary responder to handle the disruption. In FIG. 3, the GUI 300 states that a visitor is approaching the front door, and that "user A" is the primary responder. The "user A" in the actual application may be a specific name or identifying noun, such as "Tom", "Dad", or the like. The GUI 300 also provides virtual buttons including an "ok" button 302 and a manual override button 304. The manual override button 304 may be selected by a secondary responder that volunteers to handle the pending disruption. In response to receiving a user input selecting the manual override button 304, the notification controller 102 may log a record of this event in the historical user selections 122. The controller 102 may also generate a message that is communicated to the primary responder to inform the primary responder that one of the secondary responders has volunteered to handle the disruption.

The operations of the notification routing system 100 described herein are designed to intelligently manage the handling of pending disruptions based on user activity and other contextual information to limit the overall disturbances created by the pending disruptions. Application of the notification routing system 100 is particularly useful in residences and businesses that involve people participating in online classes and/or meetings, people diligently studying and/or working, people napping, and the like, as the disruption may be handled without disturbing those people, if possible. The notification routing system 100 is also particularly useful in environments with pets, such as dogs.

In a first example use case, Parent A is in a work online meeting; Parent B is watching a TV show; Child C is in an online class for school; and Child D is playing a game. A dog is in the residence and typically barks at the sound of a delivery. A delivery notification may be sent to Parent A's smartphone indicating that a delivery driver is four stops away. The system 100 may assign Parent B as the primary responder based on activity, even if Parent A is ranked higher than Parent B in the user priority list 120. The controller 102 routes the primary notification to Parent B's smartphone, and may communicate secondary notifications to the remaining house members. Parent A, Child C. and Child D are poised to mute their microphones (for when the dog barks) and know that Parent B is primed to be the responder. Parent B's notification can offer to pause playback of the TV show as well as temporarily suppress the global audible doorbell notification (thus reducing the likelihood of the dog barking). If two users are determined to have the same or similar priority (e.g., inconvenience scores or values) based on the factors, the notification controller 102 may assign both users as the primary responder to receive the primary notification.

A second example use case may be the same as the first example user case, except that Parent B is on the second floor while Child D is on the first floor, closer to the pending disruption. The closer proximity of Child D to the pending disruption than parent B weighs in favor of selecting Child D as the primary responder. Child D may be selected as the primary responder if the controller 102 determines that, in aggregate, it is mor appropriate and convenient for Child D to address the disruption than Parent B.

Figure 4:
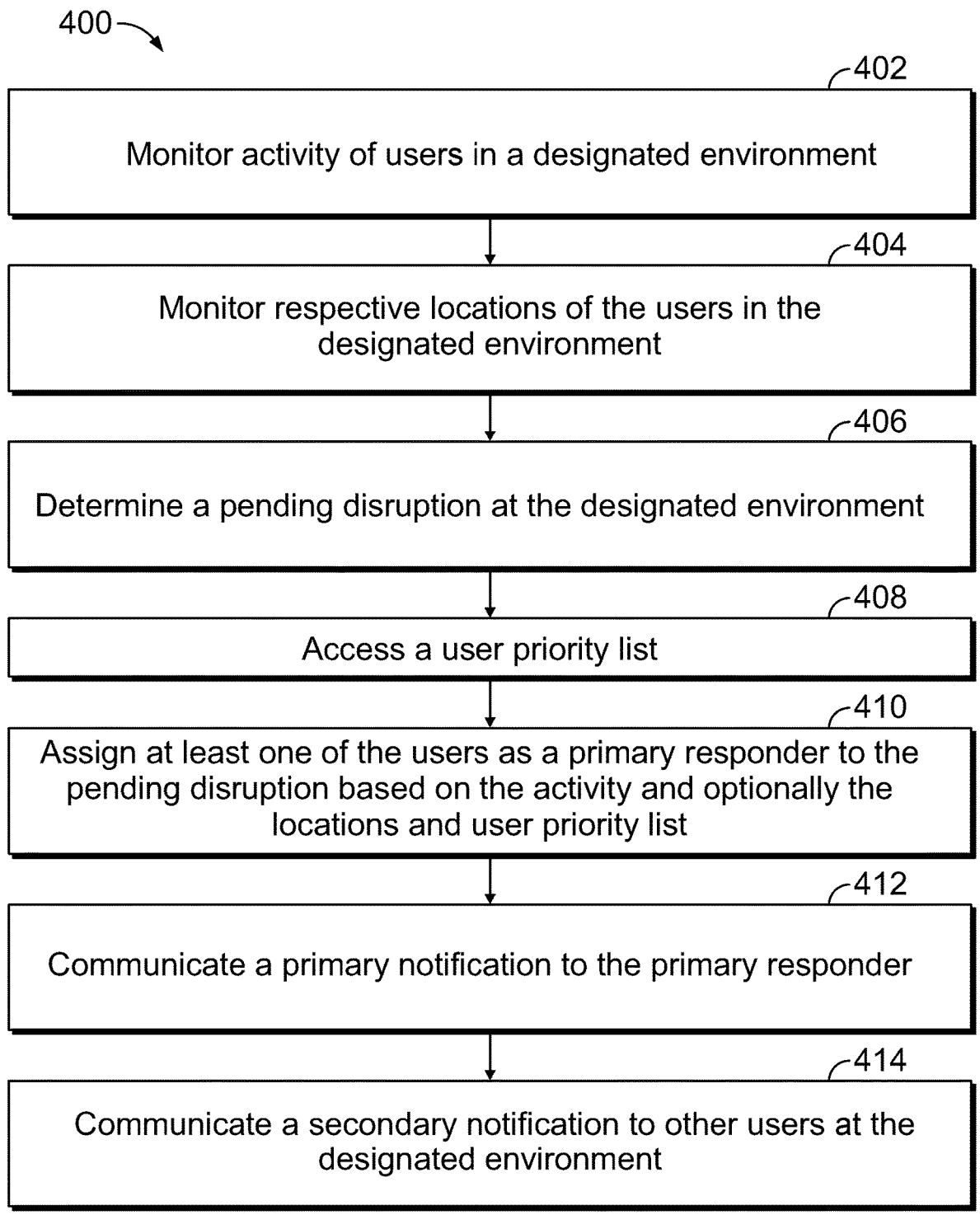
FIG. 4 is a flow chart of a method of routing disruption notifications to users in a designated environment according to an embodiment.

FIG. 4 is a flow chart 400 of a method of routing disruption notifications to users in a designated environment according to an embodiment. The method may be performed by the notification controller 102, such as the one or more processors 114 thereof. Some aspects of the method may be performed by the machine learning algorithm 124 or another computer-based model. The method optionally may include at least one additional step than shown, at least one fewer step than shown, and/or at least one different step than shown in FIG. 4.

At step 402, activity of users in a designated environment is monitored. The activity of the users may be monitored by receiving device data generated by electronic devices and/or monitoring network data on a network to which the electronic devices are connected. Monitoring the activity may include associating a first activity with a first user of the users based on (i) a specific electronic device uniquely associated with the first user being used in the first activity, (ii) an authentication uniquely associated with the first user being used to access the first activity, and/or (iii) a type or identification of the first activity being uniquely associated with the first user.

At step 404, respective locations of the users in the designated environment are monitored. At step 406, a pending disruption is determined at the designated environment. The designated environment may be a residence or a business, and determining the pending disruption may include detecting, via one or more sensors, that a third party is within a designated proximity of the residence or the business.

At step 408, a user priority list is accessed. The user priority list may be stored in a data storage device. The user priority list may provide a ranked order of the users in the designated environment.

At step 410, at least one of the users is assigned as a primary responder to handle the pending disruption based at least in part on the activity of the users. Optionally, the primary responder is assigned based on multiple factors. The multiple factors may include the activity of the users, the respective locations of the users, the ranked order in the user priority list, and/or historical user selections. The historical user selections are input by the users over time via at least one user interface, and recorded. The historical user selections may be analyzed to determine which user(s) to assign as the primary responder.

At step 412, a primary notification is communicated to a first electronic device of the electronic devices, with which the primary responder interacts. The primary notification notifies the primary responder about the pending disruption prior to the pending disruption creating a disturbance at the designated environment. Communicating the primary notification to the first electronic device may automatically cause the first electronic device to emit an audible alert, pause media content, mute a microphone, deactivate a second electronic device, and/or turn off an appliance.

Optionally, at step 414, a secondary notification may be communicated to a second electronic device of the electronic devices, with which a secondary responder of the users interacts. The secondary notification may be different from the primary notification. For example, the secondary notification may cause the second electronic device to provide a silent notification that does not automatically interrupt the respective activity of the secondary responder. The secondary notification may include a graphical user interface that is displayed on the second electronic device and enables the secondary responder to override an assigned status as the secondary responder and handle the pending disruption.

Closing Statements

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

Aspects are described herein with reference to the Figures, which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified. The program instructions may also be loaded onto a device to cause a series of operational steps to be performed on the device to produce a device implemented process such that the instructions which execute on the device provide processes for implementing the functions/acts specified.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally, or alternatively, the units/modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Further, in the following claims, the phrases "at least A or B", "A and/or B", and "one or more of A and B" (where "A" and "B" represent claim elements), are used to encompass i) A, ii) B or iii) both A and B.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. A method comprising:
   monitoring, via one or more processors, activity of users in a designated environment, the activity of the users monitored by receiving device data generated by electronic devices or monitoring network data on a network to which the electronic devices are connected;
   determining a pending disruption at the designated environment by determining that a third party is at least one of within a designated proximity of the designated environment or approaching the designated environment;
   assigning one of the users as a primary responder to handle the pending disruption based at least in part on the activity of the users; and
   communicating a primary notification to a first electronic device of the electronic devices, with which the primary responder interacts, to notify the primary responder about the pending disruption prior to the pending disruption creating a disturbance at the designated environment.

2. The method of claim 1, wherein monitoring the activity of the users includes associating a first activity with a first user of the users based on at least one of (i) a specific electronic device uniquely associated with the first user being used in the first activity, (ii) an authentication uniquely associated with the first user being used to access the first activity, or (iii) a type or identification of the first activity being uniquely associated with the first user.

3. The method of claim 1, wherein the designated environment is one of a residence or a business.

4. The method of claim 1, wherein communicating the primary notification to the first electronic device is configured to automatically cause the first electronic device to one or more of emit an audible alert, pause media content, mute a microphone, deactivate a second electronic device, or turn off an appliance.

5. The method of claim 1, further comprising communicating a secondary notification to a second electronic device of the electronic devices, with which a secondary responder of the users interacts, wherein the primary notification is different from the secondary notification.

6. The method of claim 5, wherein the secondary notification is configured to cause the second electronic device to provide a silent notification that does not automatically interrupt the respective activity of the secondary responder.

7. The method of claim 5, wherein the secondary notification includes a graphical user interface that is displayed on the second electronic device and enables the secondary responder to override an assigned status as the secondary responder and handle the pending disruption.

8. The method of claim 1, further comprising monitoring respective locations of the users in the designated environment, and wherein the primary responder is assigned based on both the activity of the users and a proximity of the primary responder to the pending disruption.

9. The method of claim 1, further comprising accessing a user priority list stored in a data storage device, the user priority list providing a ranked order of the users in the designated environment, and wherein the primary responder is assigned based on both the activity of the users and the ranked order in the user priority list.

10. The method of claim 9, further comprising monitoring respective locations of the users in the designated environment, and wherein the primary responder is assigned based on the activity of the users, the ranked order in the user priority list, and a proximity of the primary responder to the pending disruption.

11. The method of claim 1, further comprising recording and analyzing historical user selections input by the users over time via at least one user interface, and wherein the primary responder is assigned based on both the activity of the users and the historical user selections.

12. The method of claim 1, wherein, in response to the activity indicating that at least one of the users is asleep in the designated environment, the method includes suppressing an audible ring of a doorbell.

13. A notification routing system comprising:
   a communication device; and
   a controller including one or more processors, the controller communicatively connected to the communication device and electronic devices within a designated environment, the controller configured to:
      monitor activity of users in the designated environment by one or both of receiving device data generated by the electronic devices or monitoring network data on a network to which the electronic devices are connected;
      determine a pending disruption at the designated environment by determining that a third party is at least one of within a designated proximity of the designated environment or approaching the designated environment;
      assign one of the users as a primary responder to handle the pending disruption based at least in part on the activity of the users; and
      communicate, via the communication device, a primary notification to a first electronic device of the electronic devices, with which the primary responder interacts, to notify the primary responder about the pending disruption prior to the pending disruption creating a disturbance at the designated environment.

14. The notification routing system of claim 13, further comprising one or more sensors communicatively connected to the controller, the controller configured to determine the pending disruption in response to the one or more sensors detecting the third party within the designated proximity of the designated environment.

15. The notification routing system of claim 13, further comprising the first electronic device, wherein, in response to receiving the primary notification, the first electronic device is configured to one or more of emit an audible alert, pause media content, mute a microphone, deactivate a second electronic device, or turn off an appliance.

16. The notification routing system of claim 13, wherein the controller is configured to communicate, via the communication device, a secondary notification to a second electronic device of the electronic devices, with which a secondary responder of the users interacts, wherein the primary notification is different from the secondary notification.

17. The notification routing system of claim 16, further comprising the second electronic device, wherein, in response to receiving the secondary notification, the second electronic device is configured to provide a silent notification that does not automatically interrupt the respective activity of the secondary responder.

18. The notification routing system of claim 13, further comprising a data storage device communicatively connected to the one or more processors, the controller configured to access a user priority list stored in the data storage device and providing a ranked order of the users in the designated environment, the controller configured to assign the primary responder based on both the activity of the users and the ranked order in the user priority list.

19. The notification routing system of claim 18, wherein the controller is configured to monitor respective locations of the users in the designated environment, and the controller is configured to assign the primary responder based on the activity of the users, the ranked order in the user priority list, and respective proximities of the users to the pending disruption.

20. A computer program product comprising a non-transitory computer readable storage medium, the non-transitory computer readable storage medium comprising computer executable code configured to be executed by one or more processors to:
  monitor activity of users in a designated environment by one or both of receiving device data generated by electronic devices in the designated environment or monitoring network data on a network to which the electronic devices are connected;
  determine a pending disruption at the designated environment by determining that a third party is at least one of within a designated proximity of the designated environment or approaching the designated environment;
  assign one of the users as a primary responder to handle the pending disruption based at least in part on the activity of the users; and
  communicate a primary notification to a first electronic device of the electronic devices, with which the primary responder interacts, to notify the primary responder about the pending disruption prior to the pending disruption creating a disturbance at the designated environment.

* * * * *